Aug. 20, 1957     T. M. COLE     2,803,721
THERMAL LATCHING MEANS, PARTICULARLY FOR AMBIENT
TEMPERATURE COMPENSATION OF CIRCUIT BREAKERS
Filed July 3, 1953
FIG. 1
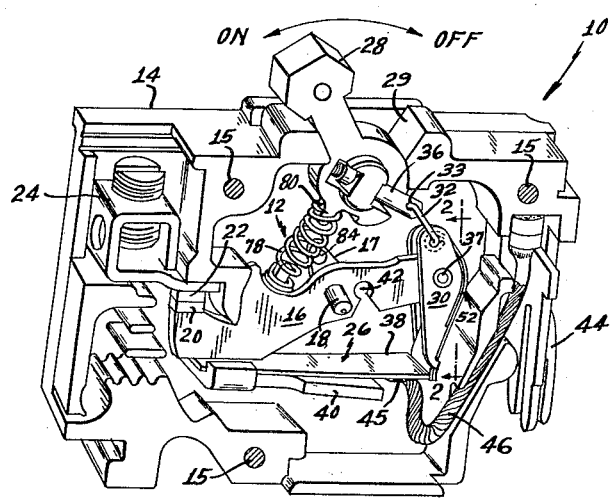
FIG. 2
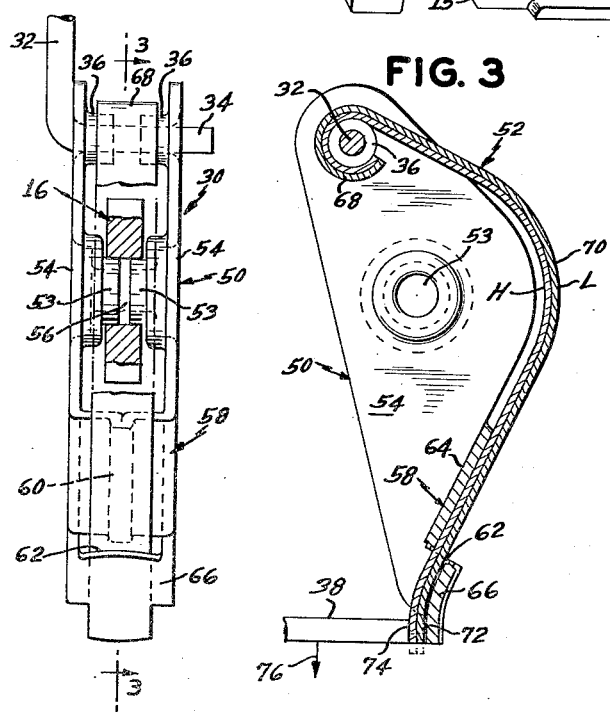
FIG. 3
FIG. 4
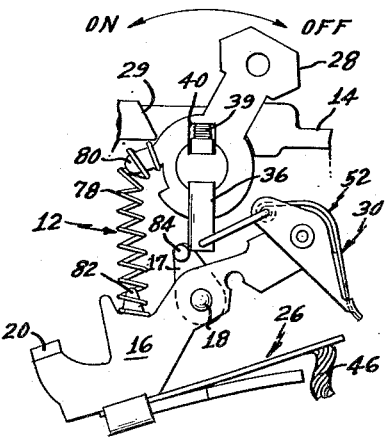
INVENTOR.
Thomas M. Cole
BY Edwin Jensen +
Harry Cole
ATTORNEYS United States Patent Office 2,803,721
Patented Aug. 20, 1957

2,803,721

THERMAL LATCHING MEANS, PARTICULARLY FOR AMBIENT TEMPERATURE COMPENSATION OF CIRCUIT BREAKERS

Thomas M. Cole, Harrison, N. Y., assignor to Federal Electric Products Company, Newark, N. J., a corporation of Delaware Application July 3, 1953, Serial No. 365,818

22 Claims. (Cl. 200—116)

The present invention relates, in general, to automatic circuit breakers and, in particular, to a circuit breaker which is compensated for changes or variations in the ambient temperature.

In circuit breakers of the type provided with a thermally responsive control device or latch, which operates to open the breaker when the current therethrough reaches a predetermined magnitude, which current, in turn, generates a predetermined temperature sufficient to operate the control device, it will be apparent that the circuit breaker will open when the ambient temperature reaches said predetermined temperature regardless of the current magnitude through the breaker. Moreover, when the ambient temperature is quite low, the current may have to reach a greater magnitude than the predetermined magnitude in order to generate the temperature required to operate the thermal control device. Similarly, as the ambient temperature increases a smaller current magnitude, than that predetermined, will operate the circuit breaker. The problem of temperature compensation arises especially where the circuit breakers are subjected to ambient temperatures encountered in high altitudes, in deserts, in Arctic areas, etc., or to the ambient temperatures of heating or refrigerating equipment.

Therefore, it is the primary object of the present invention to provide, in a circuit breaker having a thermally responsive control element, means to compensate for changes or variations in the ambient temperature.

In my prior copending application Serial No. 234,303, filed June 29, 1951, which issued as Patent No. 2,653,202 on September 22, 1953, and assigned to the assignee hereof, provision is made for an automatic circuit breaker having means to compensate for variations in the ambient temperature, wherein a manually operable actuator releasably engages a catch provided on an ambient temperature compensating element, and the flexible thermal control element is provided with a latch element which engages the catch in the closed condition of the circuit breaker to releasably retain said actuator in operative engagement with the movable contact member. Therefore, it is another object of the present invention to provide an ambient temperature compensating device which obviates the necessity for said separate catch and latch elements. Pursuant thereto, it is a more specific object of the present invention to provide the ambient temperature compensating element in a manually operable actuator means.

It is a further object of the present invention to provide an ambient temperature compensating device of generally simplified and improved construction which, however, is highly efficient in operation.

The above and other objects, features and advantages of the present invention will be more fully understood from the following description considered in connection with the accompanying illustrative drawings.

In the drawings:

Fig. 1 is a perspective view of an automatic circuit breaker pursuant to the present invention, a portion of the circuit breaker housing being removed for purposes of illustration, the breaker being illustrated in the closed or circuit making condition thereof;

Fig. 2 is a fragmentary view on an enlarged scale, taken in the direction of the arrows 2—2 in Fig. 1, with parts broken away and in section for purposes of illustration;

Fig. 3 is a sectional view taken on the line 3—3 of Fig. 2; and

Fig. 4 is a fragmentary view of the circuit breaker mechanism in the open or circuit interrupting condition thereof.

Referring now to the drawings in detail, the circuit breaker 10 is of the general type illustrated and described in my prior copending applications Serial No. 127,433, filed November 15, 1949, now Patent No. 2,647,186 dated July 28, 1953, and Serial No. 234,304, filed June 29, 1951, now Patent No. 2,685,009, dated July 27, 1954, both assigned to the assignee hereof, and said circuit breaker 10 functions to control a circuit in which it is connected in the same manner as described in said patents. The circuit breaker mechanism, generally indicated by the reference numeral 12, is suitably mounted within a two part insulated casing or housing 14, of which only one part is shown herein, the other part thereof being removed for purposes of illustration, said parts being retained in housing defining relation, as by bolts 15. The circuit breaker mechanism comprises a movable contact member or switch element 16 which is suitably mounted within the casing 14 on a pivot element 18 for movement to and from the circuit making and circuit breaking positions thereof as illustrated in Figs. 1 and 4, respectively, the pivot being mounted in bearings provided on the casing parts, one of which is illustrated at 17. The movable contact member 16 is provided, at one end thereof, with the movable contact 20 which is adapted to engage a companion stationary contact 22 provided on a terminal 24 suitably mounted in the circuit breaker casing.

The pivotal movement of the movable contact member 16 may be accomplished manually by a handle 28 which projects from an aperture 29 in the casing and which is suitably mounted for pivotal movement within the casing to and from the positions illustrated thereof in Figs. 1 and 4 respectively. In order to effect said pivotal movement of the movable contact member, by the handle 28, said handle, as shown herein and as is fully illustrated and described in my previously identified copending application Ser. No. 234,304, is operatively connected to the channel shaped actuator means 30 by a U-shaped link 32 which is pivotally connected, at one end thereof, as at 34, to said actuator means 30, and at its opposite end is pivotally connected, as at 33, to a cylindrical member or sleeve 36 which is carried by the handle. A coiled compression spring 39 is provided in the cylindrical sleeve 36 and is interposed between the latter and the handle portion 40 for resiliently biasing the contact member 16 in the circuit closed condition thereof, as illustrated in Fig. 1 for insuring the required contact pressure between the companion contacts 20 and 22 when the circuit breaker is closed. However, it will be understood that this specific means for providing the resilient contact pressure is not essential to the present invention but, on the contrary, any other type of means suitable for this purpose may be used. For example, and not by way of limitation, a resilient link may be provided between the handle and the actuator, as illustrated and described in Patent No. 2,209,352, or a combined resilient link and a rigid link may connect the handle to the actuator, as illustrated and described in my previously identified copending application 234,303, or, as illustrated and described in the copending application of Paul M. Christensen Serial No. 221,420, filed April 17, 1951, and assigned to the assignee hereof, the required contact pressure may be achieved by providing for limited bodily movement of the movable contact member on a floating pivot.

The actuator means 30 is pivotally connected to the link 32 as by the confronting extrusions or sleeves 36—36 provided therein, through which the end 34 of the link 32 projects as illustrated in Fig. 2, and the actuator means is pivotally mounted on the movable contact member 16, as at 37. The actuator is operatively connected to the movable contact member 16 for moving the latter, under the control of a current-responsive latch 26, which includes a flexible bimetallic strip 38 and magnetic device 40, by which said actuator means 30 is releasably latched to the movable contact member 16, as described in my above-mentioned application Serial No. 127,433 and in Patent Re. No. 23,188. As here shown, a peripherally interrupted opening 42 is provided at the edge of the movable contact member 16. Said opening is adapted, as described in detail in my copending application Serial No. 213,591, filed March 2, 1951, now Patent No. 2,647,187, dated July 28, 1953, and assigned to the assignee hereof, to receive a suitable tool in order to displace a part of the movable contact member in its own plane to adjust the relative disposition of the actuating means 30 and the latch 26 for calibration purposes. However, it will be understood that this method of calibration is not essential to the present invention, but on the contrary, the circuit breaker may be otherwise calibrated, for example, as illustrated and described in said Patent No. Re. 23,188 wherein provision is made in the movable contact member for a slot, a screw being adjustable therein for calibrating the circuit breaker. A terminal member 44 is connected through a flexible conductor 46 to the latch 26, as at 45. While, as here shown, said terminal member is in the form of a prong of the plug-in type, as described in my prior application Ser. No. 127,433, now Patent No. 2,647,186, it will be understood that this is not essential to the present invention, but on the contrary, a different type of terminal member can be provided instead.

Pursuant to the present invention, the actuator means 30 is constituted by a channel shaped member 50 in which the previously described projections 36—36 are formed, for pivotally connecting the actuator to the link 32, and by an ambient temperature compensating bimetallic element 52. More specifically, it will be noted that the channel shaped member 50 is pivotally mounted at the end of the movable contact member 16, opposite the end thereof which is provided with the movable contact 20, by the punched-in confronting portions 53—53, in the opposing walls 54 thereof, which portions pivotally engage in an aperture 56 provided in the movable contact member. It will be noted that adjacent the lower end thereof, the channel shaped member 50 is provided with a transversely extending wall 58 which interconnects the side walls 54—54 thereof, which wall is provided with a suitable reinforcing bead 60. Adjacent the lower end thereof, the transversely extending wall 58 is transversely slotted, as at 62, to define the rear wall portions 64 and 66. In order to provide for the mounting thereof in the actuator means 30, the compensating bimetallic element 52 is provided, at the upper end thereof with the portion 68, which is looped about the projections or sleeves 36 provided on the walls 54—54 of the channel shape member 50, as best illustrated in Figs. 2 and 3. From the loop 68 thereof, the compensating bimetal 52 extends through a generally arcuate portion 70 which slideably engages the wall portion 64, extends through slot 62, and which, at its lower end, slideably engages the wall portion 66, and terminates in a latching tip 72. In accordance with the present invention, the free end 74 of the thermally responsive control element 38 is not in latched engagement with the wall portion 66 of the channel shaped actuating element 50, as heretofore, but, as illustrated in Figs. 1 and 3, is in latched engagement with the latching tip 72 of the compensating bimetallic element 52. The low expansion side of the compensating bimetal 52 is generally indicated at L, and the high expansion side thereof is indicated at H. Consequently, it will be apparent that an increase in the ambient temperature will cause the curved element 52 to expand so that lower end 72 thereof moves downwardly, as from the full line position thereof, to the broken line position thereof, as in Fig. 3. This of course increases the degree or extent of overlap of the latching tip 72 of the compensating bimetal relative to the latching end 74 of the thermally responsive bimetal 38, whereby to require a greater current magnitude through the bimetal 38 to flex the latter sufficiently in the direction of the arrow 76, in Fig. 3, to effect the opening or tripping of the circuit breaker. This therefore compensates for an increase in the ambient temperature. A decrease in the ambient temperature causes the curved bimetallic compensating element 52 to flex or contract in a direction to move the latching tip 72 thereof upwardly, as from the broken line to the full line position thereof illustrated in Fig. 3, whereby to decrease the degree or extent of overlap thereof with the current control bimetal 38, so as to decrease the current magnitude which is necessary to flex the bimetal 38 sufficiently to disengage the compensating bimetal 52. This therefore compensates for a decrease in the ambient temperature. It will be noted that during said compensating movements of the bimetal 52, the wall portions 64 and 66, and the slot 62 constitute guides therefor, and the portion 66 constitutes a backing for the latching portion 72 thereof.

It will be understood that, as illustrated in Fig. 1, when the handle 28 is in the "on" or circuit closed position thereof, and the actuator means 30 is latched to the movable contact member 16 by engagement of the outer end of the bimetallic strip 38 with the latching end 72 of the compensating bimetal 52, as illustrated, said actuator means being releasably restrained by said strip, relative pivotal movement of the movable contact member is prevented and contact 20 is in engagement with the contact 22. In this position, the link 32 and the actuator means 30 are in overset toggle condition. It will be understood that the link 32 is sufficiently non-resilient to perform its function of returning the actuator means 30 to a reset position thereof, relative to the latch 26, upon tripping of the circuit breaker. In order for the circuit breaker to open either automatically, that is, pursuant to the flexing of the bimetallic strip 38, either upon heating thereof or by the attraction of the strip 38 to the magnetic member 40, the toggle must be broken and this can take place either by movement of the handle 28 to its circuit open position, as illustrated in Fig. 4, manually, or by release of the latching end 72 of the actuator means 30 by the bimetallic strip 38 when the circuit breaker trips upon overload or other predetermined load conditions. The opening of the circuit breaker when the latch 26 releases the actuator 30 is effected by the spring 78 which is connected at one end thereof to the handle part 80 and which is connected at its other end to the part 82 of the movable contact member. It will be observed that said spring is compressed in the circuit closed condition of the circuit breaker so as to bias the movable contact member 16 to the circuit open position and to move the latter to said position when the latch 26 disengages the actuator 30. Also, it will be noted that said spring is effective to move the handle 28 to its "off" or circuit open position when the circuit breaker is tripped, that is when the movable contact member moves to a circuit open position pursuant to the release of the actuator means 30 by latch 26. Further, it will be observed that even though the handle is held in the "on" position thereof, said spring is effective to open the circuit breaker when the latter is tripped, that is, when the latch 26 disengages the actuator means 30. In order to prevent the possible buckling of said spring in the circuit closed condition thereof, the casing is provided with the projecting portion 84 which is carried by the bearing portion 17 of the casing part for the pivot 18.

With reference to the magnetic action for tripping the circuit breaker upon overloads in excess of that for which the circuit breaker is designed to open under the control of the thermal member 38 by flexing of the latter in response to the heating thereof, the electro-magnetic device 40 is operable instantaneously to effect disengagement of the companion contact members. It will be understood that upon the occurrence of such excess overload, magnetic attraction occurs between the magnetic member 40 and the thermal strip 38 which results in the deflection of the thermal strip for disengaging the latter from the actuator means 30, and in this connection it will be understood that since the armature member 40 is rigid and the thermal current-carrying element 38 is flexible, said element is moved by magnetic attraction to member 40, thus deflecting or unlatching thermal element 38 from the actuator means 30.

It will be apparent from the foregoing that I have provided a simple, yet efficient ambient temperature compensating device, associated with the actuator of an automatic circuit breaker, which will serve to maintain the circuit breaker mechanism at a preset calibrated condition thereof and which calibration will not be affected by variations or changes in the ambient temperature to which the breaker may be subjected.

While I have shown and described the preferred embodiments of my invention, it will be understood that various changes may be made in the idea or principles of the invention within the scope of the appended claims.

Having thus described my invention, what I claim and desire to secure by Letters Patent is:

1. A circuit breaker having relatively movable contacts engageable with and disengageable from each other for making and breaking the circuit, and mechanism, including a current responsive flexible bimetal latch and actuator means releasably connected to said latch in predetermined relation, to make and break the circuit under the control of said latch and actuator means, said actuator means having a compensating thermal responsive member releasably engaged with said bimetal latch for adjustment of said releasable connection of said actuator means to said latch in response to ambient temperature variations for maintaining said predetermined latch and actuator relation substantially constant throughout a range of ambient temperatures said thermal responsive member being in slidable engagement with said latch and confined against lateral deflection.

2. A circuit breaker having relatively movable contacts engageable with and disengageable from each other for making and breaking the circuit, and mechanism, including a current responsive flexible bimetal latch and actuator means releasably connected to said latch in predetermined relation, to make and break the circuit under the control of said latch and actuator means, said actuator means having means to compensate for flexing of said bimetal latch in response to ambient temperature variations whereby to substantially neutralize the effects of said ambient temperature variations, said compensating means being a compensating thermal responsive member included in said actuator means, said compensating member being confined against lateral deflection and releasably connected in slidable overlapping relation to said bimetal latch to releasably connect said actuator means thereto and for concomitant adjustment of said overlapping connection with the latch when the latter flexes in response to ambient temperature variations, whereby to maintain said predetermined latch and actuator relation substantially constant throughout a range of ambient temperature.

3. In a circuit breaker having relatively movable contacts engageable with and disengageable from each other for making and breaking the circuit, a movable member carrying one of said contacts and mechanism, including a current responsive flexible bimetal latch and actuator means releasably connected to said latch in predetermined relation, to make and break the circuit under the control of said latch and actuator means; that improvement which comprises actuator means having provision to compensate for flexing of said bimetal latch in response to ambient temperature variations whereby to substantially neutralize the effects of said ambient temperature variations, said actuator means comprising an actuator element and a compensating element, said actuator element being pivotally mounted on said movable member and said latch bimetal being carried by said movable member, and said compensating element being a flexible member carried by said actuator element and releasably engaged with said bimetal latch for operatively connecting said actuator means to said movable contact member under the control of said bimetal latch when said compensating element is engaged therewith and for concomitant adjustment of said releasable connection in response to ambient temperature variations for maintaining said predetermined latch and actuator relation substantially constant throughout a range of ambient temperatures.

4. In a circuit breaker having relatively movable contacts engageable with and disengageable from each other for making and breaking the circuit, a movable member carrying one of said contacts and mechanism, including a current responsive flexible bimetal latch and actuator means releasably connected to said latch in predetermined relation, to make and break the circuit under the control of said latch and actuator means; that improvement which comprises actuator means having provision to compensate for flexing of said bimetal latch in response to ambient temperature variations whereby to substantially neutralize the effects of said ambient temperature variations, said actuator means comprising an actuator element and a compensating element, said actuator element being pivotally mounted on said movable member, and said latch bimetal being carried by said movable member, and said compensating elements being a flexible member carried by said actuator element and releasably engaged with said bimetal latch for operatively connecting said actuator means to said movable contact member under the control of said bimetal latch when said compensating element is engaged therewith and for concomitant adjustment of said releasable connection in response to ambient temperature variations for maintaining said predetermined latch and actuator relation substantially constant throughout a range of ambient temperatures and manually operable means operatively connected to said actuator element for moving said actuator means and thereby moving said movable contact member to engage and disengage said contacts and spring means biasing said movable contact member and automatically operable to move the latter to disengage said contacts when said bimetal latch disengages said compensating element.

5. In a circuit breaker having relatively movable contacts engageable with and disengageable from each other for making and breaking the circuit, a movable member carrying one of said contacts and mechanism, including a current responsive flexible bimetal latch and actuator means releasably connected to said latch in predetermined relation, to make and break the circuit under the control of said latch and actuator means; that improvement which comprises actuator means having provision to compensate for flexing of said bimetal latch in response to ambient temperature variations whereby to substantially neutralize the effects of said ambient temperature variations, said actuator means comprising an actuator element and a compensating element, said actuator element being pivotally mounted on said movable member and said latch bimetal being carried by said movable member, and said compensating elements being a flexible member carried by said actuator element and releasably engaged with said bimetal latch for operatively connecting said actuator means to said movable contact member under the control of said bimetal latch when said compensating element is engaged therewith and for concomitant adjustment of said releasable connection in response to ambient temperature variations for maintaining said predetermined latch and actuator relation substantially constant throughout a range of ambient temperatures, said actuator element being a channel member and having a slotted cross-part, said compensating element being a flexible bimetal strip mounted in said channel member between the opposing sides thereof and having a free end which extends through the slot to engage said bimetal latch, said bimetal strip being arranged to flex in substantially the same direction as said latch bimetal and in substantially the same amounts as the latter in response to ambient temperature variations so that said predetermined relation of said bimetal latch and said actuator means is maintained constant irrespective of ambient temperature changes within a range of different temperatures.

6. In a circuit breaker having relatively movable contacts engageable with and disengageable from each other for making and breaking the circuit, a movable member carrying one of said contacts and mechanism, including a current responsive flexible bimetal latch, to make and break the circuit under the control of said latch; said mechanism including flexible thermally-responsive actuator means releasably connected to said latch in predetermined relation and arranged to flex in substantially the same direction as said latch in substantially the same amount as the latter in response to ambient temperatures to which the circuit breaker is subjected for maintaining said predetermined latch and actuator relation substantially constant throughout a range of ambient temperatures, said latch being carried by said movable contact member, said actuator means being pivotally mounted on said movable member and operatively connected thereto under the control of said latch, and manually operable means operatively connected to said actuator means for moving said actuator means and thereby moving said movable contact member to engage and disengage said contacts.

7. Ambient temperature-compensated actuator means for an automatic circuit breaker comprising a mounting member and a thermally responsive element movable relative to said mounting member in response to variations in ambient temperature, said element being a flexible bimetal strip, said mounting member being channel shaped and provided with a slotted cross-part between the sides thereof, said sides having provision to mount said strip therebetween and the latter extending through said slot and being guided by adjacent portions of said cross-part for the flexing thereof.

8. In a circuit breaker having relatively movable contacts, mechanism for effecting the engagement and disengagement thereof, said mechanism including a current responsive bimetallic control member and means releasably connected in predetermined relation with said control member and releasably restrained by said control member, said restrained means being operable when released by said control member to effect the breaking of the circuit, said restrained means having bimetallic means operable to adjust the releasable connection thereof with said control member in response to ambient temperature variations for maintaining said predetermined relation substantially constant throughout a range of ambient temperature, said bimetallic means being slidable relative to said control member for adjusting said releasable connection and being confined against lateral deflection at said connection.

9. In a circuit breaker provided with relatively movable contacts and mechanism for effecting the engagement and disengagement thereof to make and to break the circuit, said mechanism including a current responsive bimetallic control member and a bimetallic actuator member releasably connected to said control member in predetermined relation to make and to break the circuit under the control of said control member and said actuator member, and said actuator member having relatively movable ends and being of bowed formation and slidably confined so that the distance between the ends thereof will vary with a change in ambient temperature to compensate for an ambient temperature change of said control member, whereby to maintain said predetermined relation substantially constant.

10. In a circuit breaker provided with relatively movable contacts and mechanism for effecting the engagement and disengagement thereof to make and to break the circuit, said mechanism including a current responsive bimetallic control member having a free end portion and a bimetallic actuator member releasably connected to said control member in predetermined relation at said free end portion thereof to make and to break the circuit under the control of said control member and said actuator member, and said actuator member having a free end portion which overlaps said free end portion of said control member to provide said releasable connection, and said actuator being of bowed formation and slidably confined so that the length thereof will vary with a change in ambient temperature to adjust the releasable connection of said free end portions in response to ambient temperature variations for maintaining said predetermined relation substantially constant throughout a range of ambient temperature.

11. A thermal latching mechanism including a pair of latch elements in arresting engagement under normal conditions, one of said elements including a bowed bimetal mounted on a pivot at one end thereof and slidably confined against lateral deflection at the opposite end, the other of said latch elements bearing laterally against the end portion of said bimetal where said bimetal is slidably confined.

12. A thermal latching mechanism including a pair of latch elements in arresting engagement under normal conditions, one of said latch elements including a bowed bimetal, a pivot mounting said bimetal at one end thereof, a slide bearing adjacent the opposite end of the bimetal with a portion of the bimetal projecting a limited distance beyond the slide bearing, said projecting bimetal portion being engaged laterally by the other of said latch elements and being confined against lateral deflection by said slide.

13. A circuit breaker having relatively movable contacts engageable with and disengageable from each other for making and breaking the circuit, and mechanism including a pair of latch elements in normal arresting engagement to make and break the circuit under the control of said pair of latch elements, one of said latch elements being an extensible bimetal mounted on a pivot at one end thereof and slidably confined against lateral deflection at the opposite end thereof, and the other of said latch elements bearing laterally against the bimetal at the slidably confined end thereof.

14. A circuit breaker having relatively movable contacts engageable with and disengageable from each other for making and breaking the circuit, and mechanism including a pair of latch elements in normal arresting engagement to make and break the circuit under the control of said pair of latch elements, one of said latch elements being a bowed bimetal fixed at one end thereof and slidably confined against lateral deflection at the opposite end thereof, and the other of said latch elements bearing laterally against the bimetal at the slidably confined end thereof.

15. A thermal latching mechanism including a pair of latch elements in arresting engagement under normal conditions, one of said elements including a bowed bimetal mounted on a pivot at one end thereof, and guide means in fixed relation to said pivot and slidably confining the opposite end of said bimetal for preventing lateral deflection thereof, the other of said latch elements bearing laterally against said opposite end of said bimetal.

16. A thermal latching mechanism including a pair of latch elements in arresting engagement under normal conditions, one of said elements including a bowed bimetal mounted on a pivot at one end thereof, and guide means in fixed relation to said pivot and slidably confining the opposite end of said bimetal for preventing lateral deflection thereof, the other of said latch elements bearing laterally against said opposite end of said bimetal, the other of said latch elements being releasably engaged with said bimetal in the immediate vicinity of said guide means.

17. A thermal latching mechanism including a pair of latch elements in arresting engagement under normal conditions, one of said elements including a bowed bimetal mounted on a pivot at one end thereof, and guide means in fixed relation to said pivot and slidably confining the opposite end of said bimetal for preventing lateral deflection thereof, the other of said latch elements bearing laterally against said opposite end of said bimetal, the other of said latch elements being a bimetal releasably engaged with said first mentioned bimetal in the immediate vicinity of said guide means.

18. Thermal latching mechanism including a releasable latching element and a control latching element obstructing said releasable latching element, said releasable latching element including a movable support, a bimetal having one end thereof pivotally supported on said movable support and formed with its opposite end extending generally along a line through said one end, and said bimetal being bowed between its ends, said support having lateral guide means for said opposite end of said bimetal and said control latching element being normally in engagement with a lateral surface of said releasable bimetal adjacent said guide means.

19. Thermal latching mechanism including a pair of latch elements in arresting engagement under normal conditions, one of said elements including a bimetal mounted on a pivot at one end thereof and being bowed between the ends thereof and having lateral guide means for confining the opposite end against lateral deflection, said guided end of the bimetal extending approximately along a line through said pivot, the other one of said latch elements bearing against a lateral surface of said guided end of said bimetal.

20. A thermal latching mechanism including a pair of latching elements in arresting engagement under normal conditions, one of said latching elements including a bimetal having a bowed intermediate portion, one end of the bimetal being mounted on a pivot and the other end of the bimetal being confined against lateral deflection by a guide, said other end extending generally along a line through said pivot, the other of said latching elements being a bimetal directed endwise against a lateral surface of bowed bimetal adjacent said guide means.

21. A circuit breaker provided with relatively movable contacts and mechanism for effecting engagement and disengagement thereof to make and break a circuit, said mechanism including current-responsive latching means including a thermal member, and an ambient temperature-responsive device normally latched by said current-responsive latching means, said ambient temperature-responsive device including a bowed bimetal pivotally mounted at one end thereof and having its opposite end extending along a line generally through said pivoted end, said opposite end having slidable guide means, said current-responsive latching means engaging the guided end of said bowed bimetal.

22. A circuit breaker having a pair of separable contacts, a movable contact member carrying one of said contacts, an actuator and a current-responsive device carried by said movable contact carrying member, said actuator embodying slide guide means adjacent said current-responsive device and said actuator carrying a bowed ambient temperature compensating bimetal pivotally supported on the actuator at one end thereof and having the opposite end thereof slidably received in said guide means and normally laterally engaged by said current-responsive means, said guided end of said bimetal extending generally along a line through the pivoted end of said bimetal.

References Cited in the file of this patent

UNITED STATES PATENTS

| | | |
|---|---|---|
| 1,839,935 | Thomas | Jan. 5, 1932 |
| 1,952,040 | Frank et al. | Mar. 20, 1934 |
| 2,029,980 | Besag | Feb. 4, 1936 |
| 2,069,625 | Rich | Feb. 2, 1937 |
| 2,190,517 | Jennings | Feb. 13, 1940 |
| 2,235,337 | Shaw | Mar. 18, 1941 |
| 2,284,825 | Jennings et al. | June 2, 1942 |
| 2,318,279 | Ashwanden | May 4, 1943 |
| 2,401,005 | Lindstrom et al. | May 28, 1946 |
| 2,455,753 | Getchell | Dec. 7, 1948 |
| 2,579,252 | Fisher | Dec. 18, 1951 |
| 2,632,825 | Senn | Mar. 24, 1953 |
| 2,642,509 | Cole et al. | June 16, 1953 |
| 2,650,281 | Norden | Aug. 25, 1953 |
| 2,666,828 | Dyer et al. | Jan. 19, 1954 |
| 2,696,541 | Haberman | Dec. 7, 1954 |

FOREIGN PATENTS

| | | |
|---|---|---|
| 804,623 | France | Aug. 3, 1936 |